(12) United States Patent  (10) Patent No.: US 8,280,341 B2
Edelmann et al.  (45) Date of Patent: Oct. 2, 2012

(54) GPS-ASSISTED ARCHITECTURE FOR VOIP 9-1-1

(75) Inventors: Paul Edelmann, Leesburg, VA (US); John T. Durmer, Washington, DC (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1211 days.

(21) Appl. No.: 11/304,784

(22) Filed: Dec. 16, 2005

(65) Prior Publication Data

US 2007/0140216 A1 Jun. 21, 2007

(51) Int. Cl.
*H04M 11/04* (2006.01)
(52) U.S. Cl. .................. 455/404.1; 455/404.2
(58) Field of Classification Search ............... 455/404.1
See application file for complete search history.

(56) References Cited

U.S. PATENT DOCUMENTS

| 6,940,950 | B2 | 9/2005 | Dickinson et al. ............ 379/45 |
| 2004/0190497 | A1* | 9/2004 | Knox ............................ 370/352 |
| 2004/0192271 | A1* | 9/2004 | Eisner et al. ................ 455/414.1 |
| 2005/0053209 | A1* | 3/2005 | D'Evelyn et al. ............. 379/111 |
| 2005/0243973 | A1* | 11/2005 | Laliberte ........................ 379/37 |
| 2006/0095790 | A1* | 5/2006 | Nguyen et al. ................ 713/186 |
| 2007/0041368 | A1* | 2/2007 | Lorello ......................... 370/352 |

OTHER PUBLICATIONS

"PSAP Operations Guide for Wireless 9-1-1", Intrado® Informed Response, Jul. 2005. 30 pp.
"The E911 Answer for VoIP Service Providers", http://www.ip911resource.com/press_release2.htm, Jun. 27, 2005, 2 pp.

* cited by examiner

*Primary Examiner* — Lester Kincaid
*Assistant Examiner* — Joel Ajayi

(57) ABSTRACT

A system receives a Voice over Internet Protocol (VoIP) 9-1-1 call and Global Positioning Satellite (GPS) data from a first network device and identifies a Public Safety Answering Point (PSAP) using the received GPS data.

21 Claims, 8 Drawing Sheets

GPS-ASSISTED ARCHITECTURE FOR VOIP 9-1-1

FIELD OF THE INVENTION

Implementations consistent with the principles of the invention relate generally to communications networks and, more particularly, to routing Voice over Internet Protocol (VoIP) emergency 9-1-1 calls.

BACKGROUND OF THE INVENTION

The United States 9-1-1 wireline infrastructure is designed to automatically route Public Switched Telephone Network (PSTN) based 9-1-1 calls to designated geographic Public Safety Answering Points (PSAPs) based upon the ten digit Automatic Number Identification (ANI) of the 9-1-1 caller. The PSAP then confirms the address of the 9-1-1 caller by using the ANI to query subscriber area location information maintained in a local exchange carrier (LEC)-owned distributed database network. This database is updated by the LEC based upon service address information provided by subscribers. Emergency services dispatch can then be made (in instances when the caller cannot assist and/or verbally relay location information) to the registered address of the caller.

Updates have been made to the 9-1-1 wireline infrastructure to handle wireless 9-1-1 calls. Wireless calls are routed to the correct PSAP based on cell identification (ID) information and/or pseudo ten digit ANIs that are generated by third party providers. The PSAP determines caller location by either referencing cell ID-based information or the address associated with the latitude/longitude of the caller provided by the cellular carrier. In both cases area location identification information can be referenced by the PSAP (if the caller cannot assist in providing location information) to assist dispatch, but this may often be inaccurate due to the nomadic nature of cellular service.

Internet telephony, such as Voice over IP (VoIP) phone service, is reportedly poised to become the predominant technology used in the telecommunications industry. Thus, emergency calls will increasingly be placed from VoIP devices. Neither the wireline 9-1-1 infrastructure nor the updated wireless 9-1-1 infrastructure can automatically route VoIP calls to the geographically closest PSAP on a reliable basis. Moreover, even in the case where correct PSAP routing can be made, the 9-1-1 caller's area location identification information will very often be incorrect and cannot be used to assist dispatch in those situations where the caller cannot verbally relay information.

SUMMARY OF THE INVENTION

In an implementation consistent with the principles of the invention, a system includes a first network device that is configured to detect placement of a VoIP 9-1-1 call, capture current Global Positioning Satellite (GPS) data in response to the detecting, and transmit the GPS data and 9-1-1 digits.

In another implementation consistent with the principles of the invention, a method includes receiving a VoIP 9-1-1 call and GPS data from a first network device and identifying a PSAP using the received GPS data.

In still another implementation consistent with the principles of the invention, a system includes a first network device. The first network device is configured to periodically capture GPS data when the first network device is connected to a network, and transmit the captured GPS data and information identifying the first network device to a second network device.

In yet another implementation consistent with the principles of the invention, a method includes detecting, via a first device, a placing of a VoIP 9-1-1 call; obtaining, via the first device, GPS data in response to the detecting; transmitting the GPS data, information identifying the first device, and information identifying the VoIP 9-1-1 call as a 9-1-1 call to a second device; identifying, via the second device, a PSAP based on the GPS data; and forwarding the VoIP 9-1-1 call and location information relating to the GPS data to the identified PSAP.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention use GPS coordinates from a user device for routing a 9-1-1 call from the user device to the appropriate PSAP. In one implementation, the GPS coordinates are provided from a GPS device that is associated with the user device. Implementations consistent with the principles of the invention also allow for periodic updates of Automatic Location Identification (ALI) information for user devices.

Exemplary System

Figure 1:
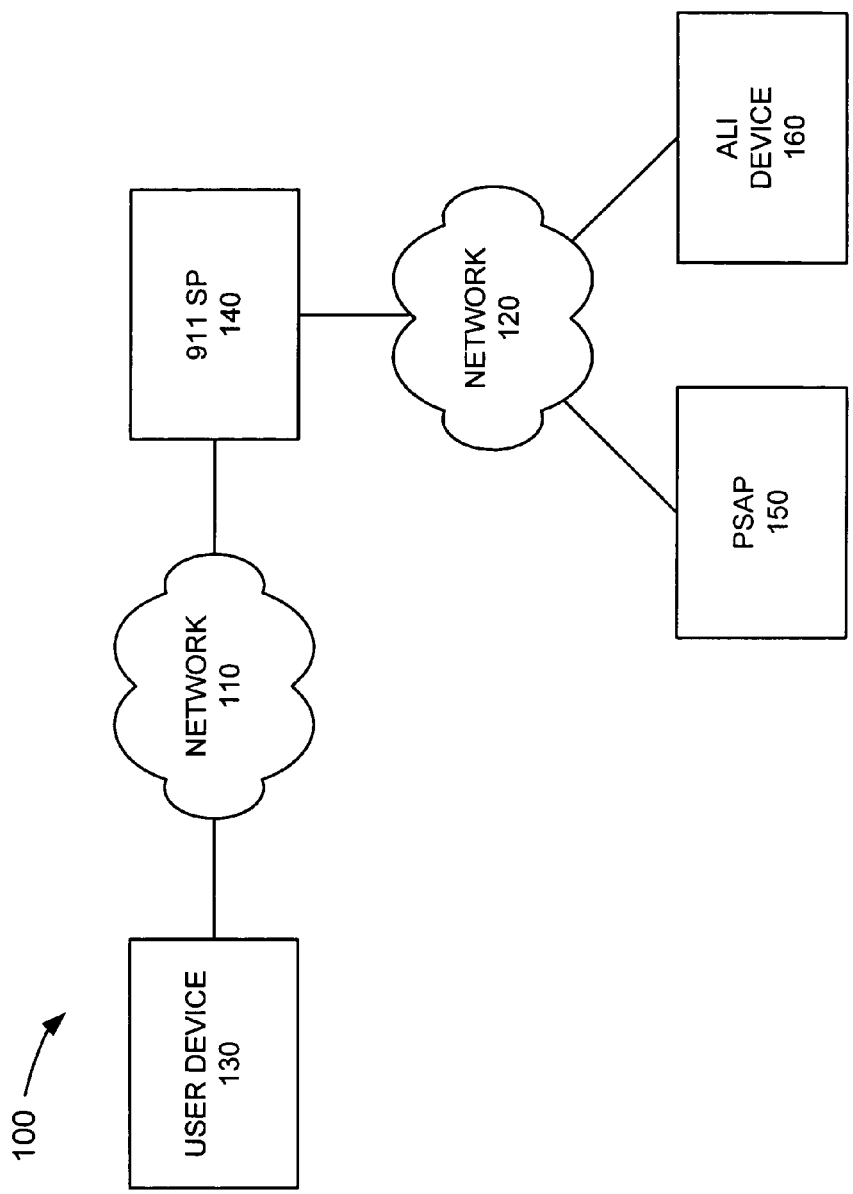
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a user device 130 that connects to a 9-1-1 service provider (SP) 140 via a network 110. 9-1-1 service provider 140 may connect to a PSAP 150 and an ALI device 160 via a network 120. The number of user devices, 9-1-1 service providers, PSAPs, ALI devices, and networks illustrated in FIG. 1 is provided for simplicity. In practice, a typical system could include more or fewer user devices, 9-1-1 service providers, PSAPs, ALI devices, and networks than illustrated in FIG. 1.

Networks 110 and 120 may include a local area network (LAN), a wide area network (WAN), a telephone network, such as the Public Switched Telephone Network (PSTN), an intranet, the Internet, or a combination of these or other networks. Although shown as separate networks, networks 110 and 120 may, in one implementation consistent with the principles of the invention, be implemented as a single network.

User device 130 may include a device, such as a personal computer, a lap top, a personal digital assistant (PDA), a wireless telephone, an Internet Protocol (IP) telephone, etc., one or more threads or processes running on these devices or other types of devices, and/or one or more objects executable by these devices. In one implementation, user device 130 may allow a user to place calls, including 9-1-1 emergency calls, using VoIP. User device 130 may connect to network 110 via any technique, such as wired, wireless, or optical connections.

9-1-1 service provider 140 may include one or more types of computer systems, such as a mainframe, minicomputer, or personal computer. 9-1-1 service provider 140 may facilitate the establishment of VoIP 9-1-1 calls between user device 130 and PSAP 150. In one implementation consistent with the principles of the invention, 9-1-1 service provider 140 may be associated with a VoIP provider, network service provider, or another party. 9-1-1 service provider 140 may connect to networks 110 and 120 via any technique, such as wired, wireless, or optical connections.

PSAP 150 can include one or more devices for receiving and processing emergency calls (e.g., 9-1-1 calls). For example, PSAP 150 may include a public entity having personnel (e.g., operators or call takers) and/or equipment for initially answering or fielding incoming 9-1-1 calls. PSAP 150 can be located in the vicinity of the source of the emergency call and in the vicinity of emergency service providers to which the call can be forwarded. PSAP 150 may connect to network 120 via any technique, such as wired, wireless, or optical connections.

ALI device 160 may include one or more devices that store location information for a user device 130 from which a 9-1-1 call can be placed. In one implementation consistent with the principles of the invention, ALI device 160 may include a database system. ALI device 160 may connect to network 120 via any technique, such as wired, wireless, or optical connections.

Exemplary User Device Configuration

Figure 2:
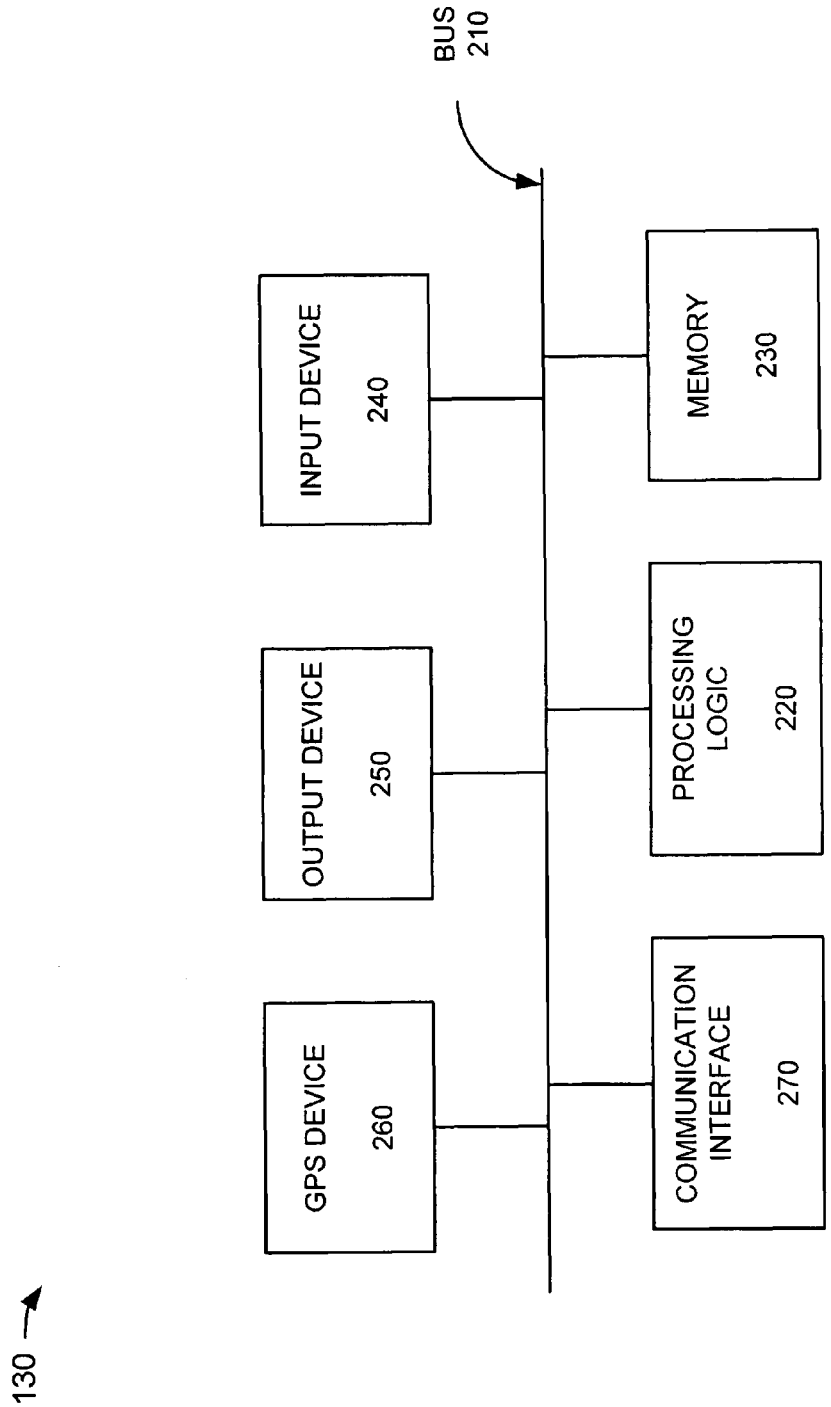
FIG. 2 illustrates an exemplary configuration of the user device of FIG. 1 in an implementation consistent with the principles of the invention.

FIG. 2 illustrates an exemplary configuration of user device 130 in an implementation consistent with the principles of the invention. As illustrated, user device 130 may include a bus 210, processing logic 220, a memory 230, an input device 240, an output device 250, a GPS device 260, and a communication interface 270. It will be appreciated that user device 130 may include other components (not shown) that aid in receiving, transmitting, and/or processing data. Moreover, it will be appreciated that other configurations are possible.

Bus 210 may permit communication among the components of user device 130. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits a user to input information to user device 130, such as a keyboard, a keypad, a mouse, a pen, a microphone, one or more biometric mechanisms, and the like. Output device 250 may include a device that outputs information to the user, such as a display, a printer, a speaker, etc.

GPS device 260 may include one or more devices for receiving GPS-based location information from, for example, a GPS satellite. GPS device 260 may be included within user device 130 or external to user device 130. For example, GPS device 260 may be implemented as an external GPS receiver or a Personal Computer Memory Card International Association (PCMCIA) card with integral GPS receiver that continuously receives GPS-based location information. GPS device 260 may store received GPS-based location information in, for example, memory 230, GPS device 260, or some other location.

Communication interface 270 may include any transceiver-like mechanism that enables user device 130 to communicate with other devices and/or systems. For example, communication interface 270 may include mechanisms for communicating with 9-1-1 service provider 140 via a network, such as network 110.

As will be described in detail below, user device 130, consistent with the principles of the invention, may allow a user to place a VoIP emergency 9-1-1 call. User device 130 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 270. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary 9-1-1 Service Provider Configuration

Figure 3:
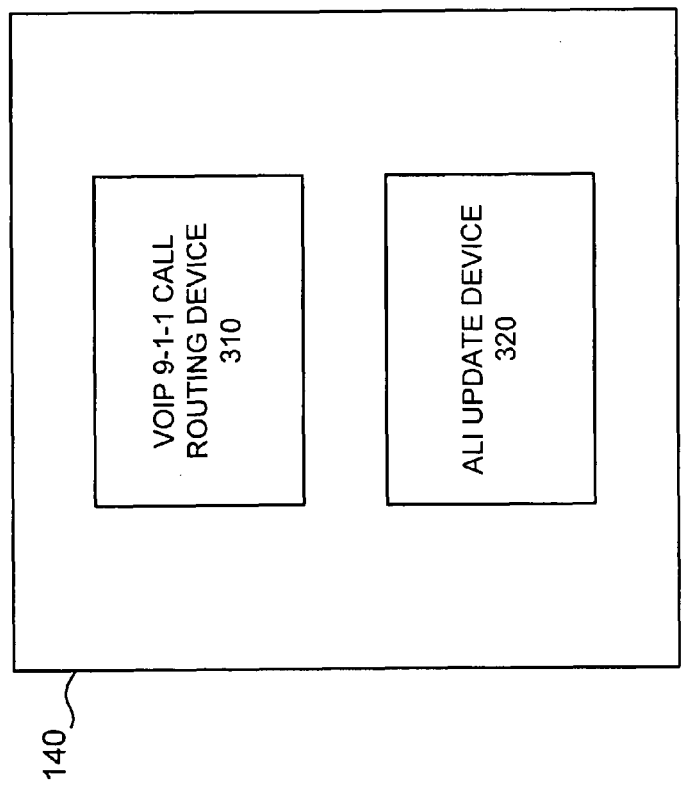
FIG. 3 illustrates an exemplary configuration of the 9-1-1 service provider of FIG. 1 in an implementation consistent with the principles of the invention.

FIG. 3 illustrates an exemplary configuration of 9-1-1 service provider 140 in an implementation consistent with the principles of the invention. As illustrated, 9-1-1 service provider 140 may include a VoIP 9-1-1 call routing device 310 and an ALI update device 320. It will be appreciated that 9-1-1 service provider 140 may include other components (not shown) that aid in receiving, transmitting, and/or processing data.

VoIP 9-1-1 call routing device 310 may include one or more devices that receive 9-1-1 emergency information from user device 130, identify an appropriate PSAP, such as PSAP 150, for handling the 9-1-1 call, and transmit the appropriate information to PSAP 150 for handling the 9-1-1 call. VoIP 9-1-1 call routing device 310 may be implemented in hardware, software, or a combination of hardware and software.

ALI update device 320 may include one or more device for receiving GPS-based location information from user device 130 and updating ALI device 160 based on the received GPS-based location information. In this way, ALI update device 320 may ensure that ALI device 160 contains the most recent location information for the user associated with user device 130. ALI update device 320 may be implemented in hardware, software, or a combination of hardware and software.

Exemplary PSAP Configuration

Figure 4:
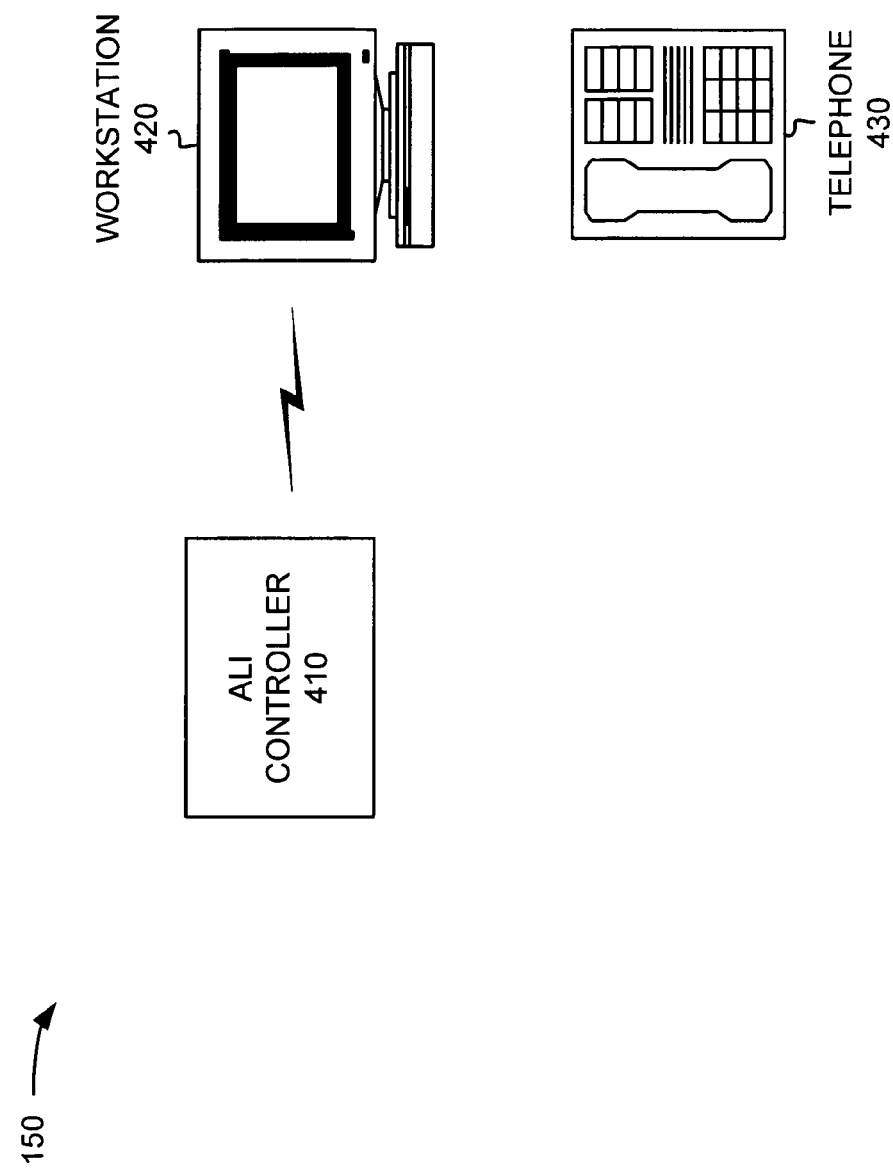
FIG. 4 illustrates an exemplary configuration of the PSAP of FIG. 1 in an implementation consistent with the principles of the invention.

FIG. 4 illustrates an exemplary configuration of PSAP 150 in an implementation consistent with the principles of the invention. As illustrated, PSAP 150 may include an ALI controller 410, a workstation 420, and a telephone 430. It will be appreciated that PSAP 150 may include other components than illustrated in FIG. 4 that aid in receiving, processing, and/or transmitting data. The number of ALI controllers, workstations, and telephones illustrated in FIG. 4 is provided for simplicity. In practice, a typical PSAP could include more ALI controllers, workstations, and/or telephones than illustrated in FIG. 4.

ALI controller 410 may include one or more devices that receive emergency 9-1-1 information from 9-1-1 service provider 140 and process the received emergency 9-1-1 information by, for example, identifying the location from where the call originates. In one implementation consistent with the principles of the invention, ALI controller 410 may identify a caller's location based on GPS-based location information received with the 9-1-1 emergency call. ALI controller 410 may, alternatively, retrieve caller location information from ALI device 160 and verify the location information using the GPS-based location information received with the 9-1-1 call.

Workstation 420 may include one or more types of computer systems, such as a mainframe, minicomputer, a personal computer, a lap top, etc. that receive emergency 9-1-1 information and provide information to an operator in response thereto. The information may include, for example, a callback number (e.g., a telephone number, a network address, etc.) and information identifying a location of the person placing the 9-1-1 call. Workstation 420 may, in some situations, forward received calls to an appropriate emergency personnel service, such as a fire department, a police station, etc.

Telephone 430 may include one or more devices that allow an operator at PSAP 150 to conduct voice communications with the person placing the 9-1-1 call. In one implementation consistent with the principles of the invention, telephone 430 may include a plain old telephone system (POTS) telephone, a session initiation protocol (SIP) telephone, a wireless telephone device, etc. In another implementation, telephone 430 may be implemented within workstation 420 or another computer device.

Exemplary Configuration of ALI Device

Figure 5:
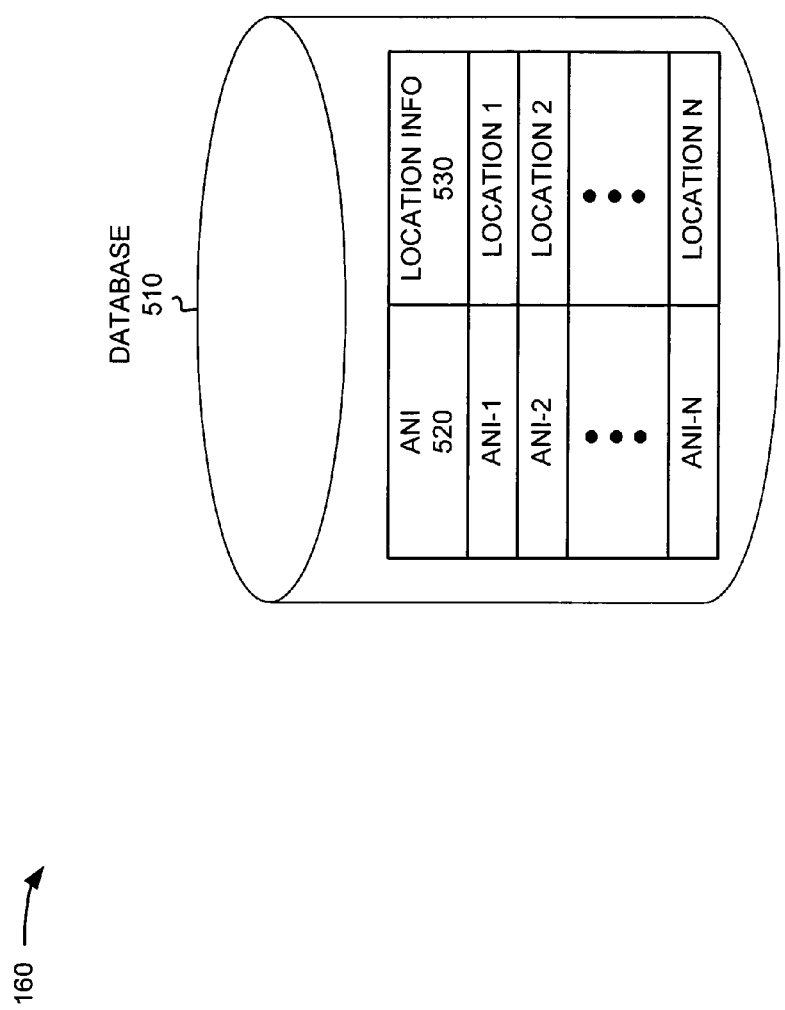
FIG. 5 illustrates an exemplary configuration of the Automatic Location Identification (ALI) device of FIG. 1 in an implementation consistent with the principles of the invention.

FIG. 5 illustrates an exemplary configuration of ALI device 160 in an implementation consistent with the principles of the invention. As illustrated, ALI device 160 may include a database 510 that stores location information for different ANIs. While only one database is described below, it will be appreciated that database 510 may consist of multiple databases stored at, for example, PSAP 150, or stored at one or more locations throughout network 120.

In one implementation consistent with the principles of the invention, database 510 may include a group of entries in the following exemplary fields: ANI field 520 and location information field 530. Database 510 may contain additional fields (not shown) that aid in identifying a location of a 9-1-1 caller.

ANI field 520 may store user device identifiers for user devices 130 in system 100. For example, the identifiers may include a telephone number, a network address, etc.

Location information field 530 may store location information for each identifier in ANI field 520. The location information may be stored as latitude/longitude coordinates, street addresses, etc. In one implementation consistent with the principles of the invention, the location information may be used by an operator at PSAP 150 for determining a location of a 9-1-1 caller or for verifying a location of a 9-1-1 caller.

Exemplary Processing

Figure 6:
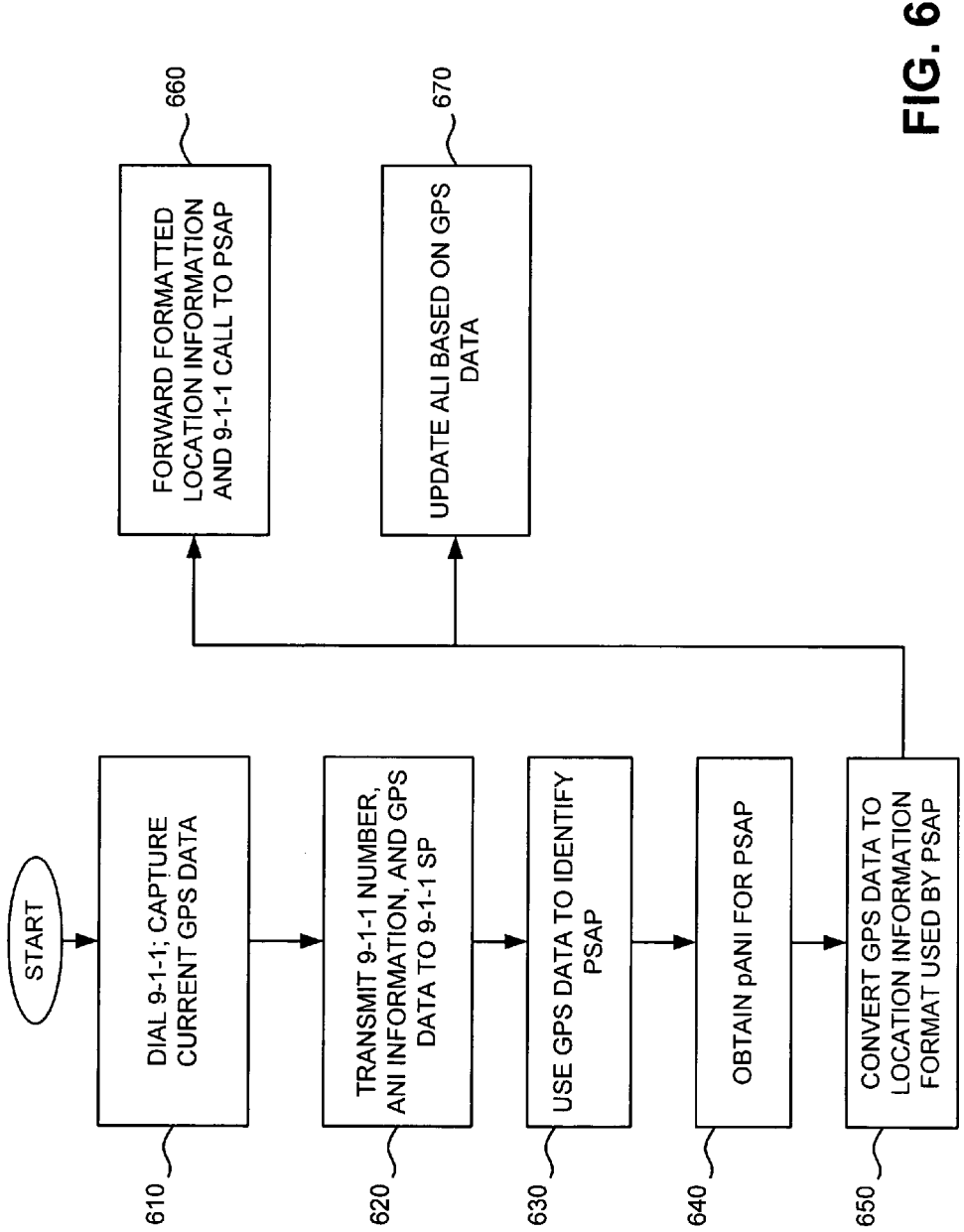
FIG. 6 illustrates an exemplary process for handling a VoIP 9-1-1 call in an implementation consistent with the principles of the invention.

FIG. 6 illustrates an exemplary process for handling a VoIP 9-1-1 call in an implementation consistent with the principles of the invention. Processing may begin with a user placing a VoIP 9-1-1 call at a user device, such as user device 130 (act 610). To place the 9-1-1 call, the user may simply dial 9-1-1 using user device 130. In response, user device 130 may capture current GPS data (act 610), using, for example, GPS device 260. If user device 130 is unable to capture current GPS data, user device 130 may retrieve the most recently captured GPS data from, for example, memory 230.

User device 130 may transmit information to 9-1-1 service provider 140 (act 620). The information may include, for example, the dialed digits (i.e., 9-1-1), ANI information for user device 130 (e.g., a telephone number associated with user device 130), and the captured (or most recently) GPS data.

In response to receiving the information from user device 130, 9-1-1 service provider 140 may use the GPS data to identify a PSAP to which to direct the 9-1-1 call (act 630). In one implementation consistent with the principles of the invention, 9-1-1 service provider 140 may use the GPS data to determine the location of user device 130. 9-1-1 service provider 140 may then identify a PSAP that is geographically closest to the location of user device 130. It is assumed for explanatory purposes that 9-1-1 service provider 140 identifies PSAP 150 as the geographically closest PSAP to the location of user device 130.

9-1-1 service provider 140 may obtain a pseudo ANI (pANI) for PSAP 150 (act 640). In one implementation consistent with the principles of the invention, the pANI, like a telephone number, may include a 10-digit number that cannot be assigned to a user device 130. Network 120 may use the pANI to route the 9-1-1 call from user device 130 to the appropriate PSAP (i.e., PSAP 150 in the example above). In one implementation, 9-1-1 service provider 140 may select an appropriate pANI from a group of available pANIs.

In those situations when PSAP 150 is capable of processing Phase I or Phase II wireless 9-1-1 calls, 9-1-1 service provider 140 may convert the received GPS data to a format that PSAP 150 may process (act 650). For example, if PSAP 150 is capable of processing Phase II wireless 9-1-1 calls, 9-1-1 service provider 140 may convert the GPS data (if necessary) to latitude and longitude coordinates and transmit these coordinates to PSAP 150 as a Phase II-formatted message. PSAP 150 may, for example, use this location information to verify the accuracy of the caller's location information in ALI device 160. This will allow PSAP 150 to avoid instances where the delay cycle associated with updating ALI device 160 renders the caller's ALI information useless.

9-1-1 service provider 140 may forward the formatted location information and the 9-1-1 call to PSAP 150 (act 660). As indicated above, the forwarding of the 9-1-1 call to PSAP 150 may be based on the pANI obtained by 9-1-1 service provider 140. PSAP 150 may then process the 9-1-1 call from user device 130 by, for example, dispatching the appropriate emergency services personnel to the location of user device 130.

9-1-1 service provider 140 may also update ALI device 160 based on the GPS data received from user device 130 (act 670). In one implementation consistent with the principles of the invention, 9-1-1 service provider 140 may, for example, forward the ANI and GPS data received from user device 130 to ALI device 160. ALI device 160 may lookup the ANI in, for example, database 510 and replace any existing location data in field 530 with the GPS data. If necessary, 9-1-1 service provider 140 or ALI device 160 may convert the GPS data into a desired format prior to storing the location information in database 510. For example, 9-1-1 service provider 140 or ALI device 160 may convert the GPS data to a physical address (e.g., street and city) prior to storing the location information. 9-1-1 service provider 140 may update ALI device 160 with the current location of user device 130 prior to, in parallel with, or subsequent to providing the information described above with respect to act 660 to PSAP 150.

Figure 7:
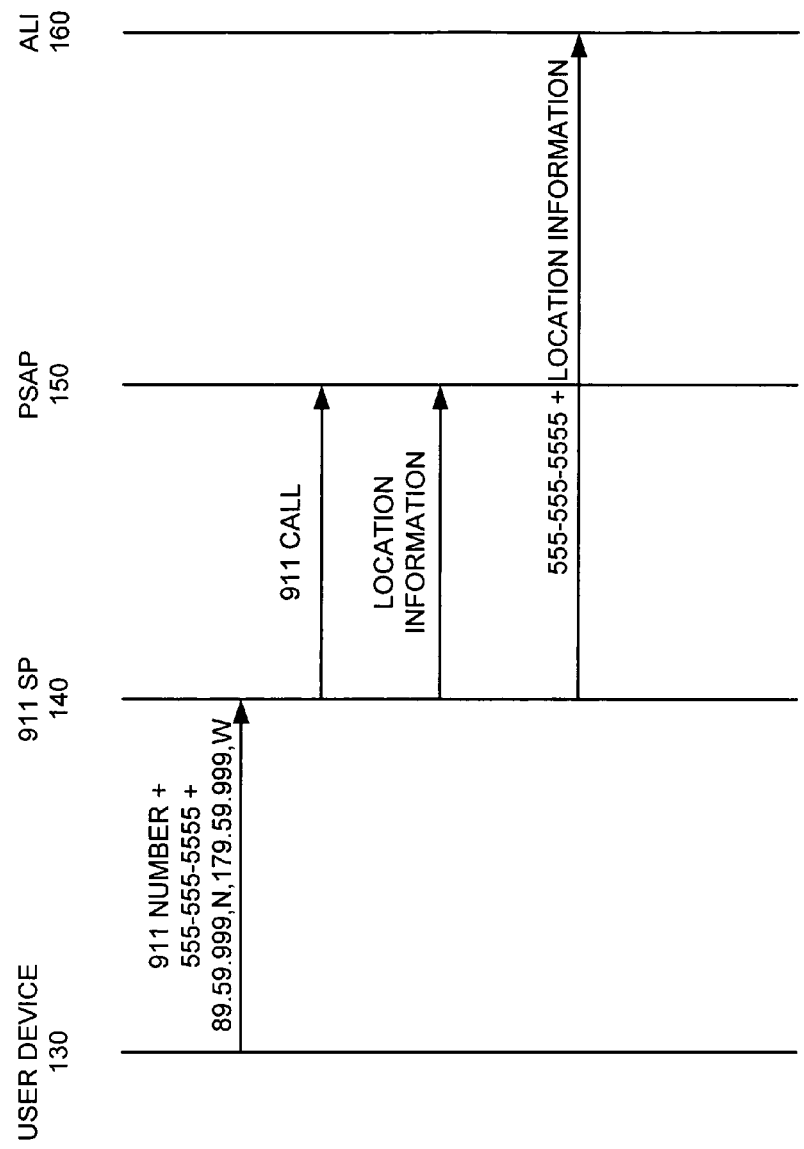
FIG. 7 illustrates exemplary processing of a VoIP 9-1-1 call in an implementation consistent with the principles of the invention.

The following example illustrates the above processing. FIG. 7 illustrates exemplary processing of a VoIP 9-1-1 call in an implementation consistent with the principles of the invention. In this example, assume that a user at user device 130 places a VoIP 9-1-1 call by dialing 9-1-1. In response, user device 130 may determine its current location by capturing current GPS data. If, as set forth above, user device 130 is unable to capture current GPS data, user device 130 may retrieve the recently captured GPS data from, for example, memory 230, GPS device 260, or from some other location. Assume that the user device 130 captures the following GPS data: 89.59.999,N,179.59.999,W. User device 130 may transmit the dialed digits (i.e., 9-1-1), the ANI of user device 130 (assumed to be "555-555-5555" for this example), and the GPS data (i.e., 89.59.999, N, 179.59.999, W) to 9-1-1 service provider 140.

In response, 9-1-1 service provider 140 may use the GPS data to identify a PSAP for handling the 9-1-1 call. It is assumed for this example that 9-1-1 service provider 140 identifies PSAP 150 as the closest PSAP to the current location of user device 130. 9-1-1 service provider 140 may obtain a pANI for PSAP 150 that will be used to route the 9-1-1 call to PSAP 150. 9-1-1 service provider 140 may also convert the GPS data to a format that is capable of being processed by PSAP 150. For example, if PSAP 150 is capable of processing wireless Phase I or Phase II calls, 9-1-1 service provider 140 may convert the GPS data to the format used by PSAP 150. The formatted GPS data is referred to in FIG. 7 as "location data." 9-1-1 service provider 140 may forward the 9-1-1 call from user device 130 to PSAP 150. 9-1-1 service provider 140 may also forward the location data to PSAP 150.

9-1-1 service provider 140 may update ALI device 160 with the current location of user device 130. 9-1-1 service provider 140 may, for example, forward the ANI of user device 130 (i.e., 555-555-5555) and either the GPS data (i.e., 89.59.999, N, 179.59.999, W) or the location data, which may or may not be formatted in a similar manner as the location data forwarded, to PSAP 150.

Figure 8:
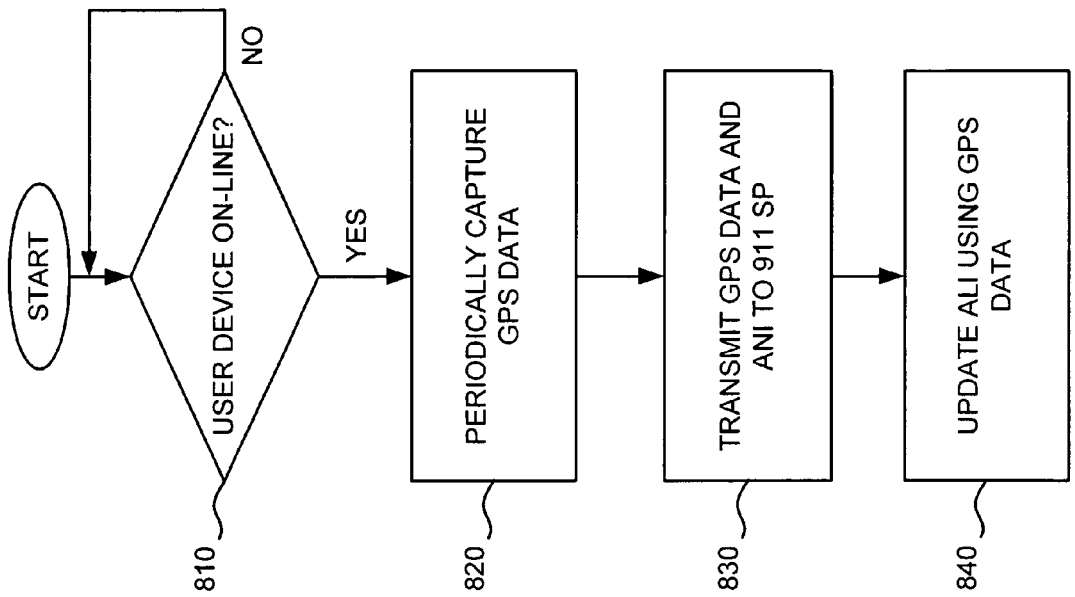
FIG. 8 illustrates an exemplary process for updating an ALI device with current location information for a user device in an implementation consistent with the principles of the invention.

FIG. 8 illustrates an exemplary process for updating ALI device 160 with current location information for a user device 130 in an implementation consistent with the principles of the invention. Processing may begin with user device 130 determining whether user device 130 is on-line (e.g., connected to network 110 or another network) (act 810). If user device 130 is not on-line, processing may return to act 810 with user device 130 periodically determining whether user device 130 is on-line.

If user device 130 is determined to be on-line, user device 130 may, at a periodic interval, capture current GPS data (act 820). In one implementation, user device 130 may capture current GPS data using GPS device 260. The GPS data may be in the form of latitude and longitude coordinates or in another form. If user device 130 is unable to capture current GPS data, user device 130 may retrieve the most recently captured GPS data from, for example, memory 230, GPS device 260, or some other location. The interval at which the GPS data is captured may be configurable by the user of user device 130.

User device 130 may transmit the GPS data (or the most recently captured GPS data) to 9-1-1 service provider 140 (act 830). The GPS data may be transmitted using an IP format, a real time protocol (RTP) format, or another format. User device 130 may also transmit ANI information (e.g., a phone number associated with user device 130) to 9-1-1 service provider 140 (act 830). The ANI information may be transmitted with the GPS data or separately from the GPS data.

9-1-1 service provider 140 may update ALI device 160 (act 840). In one implementation consistent with the principles of the invention, 9-1-1 service provider 140 may forward the ANI information and the GPS data to ALI device 160. ALI device 160 may lookup the ANI information in, for example, database 510 and replace any existing location information with the GPS data received from 9-1-1 service provider 140. If necessary, 9-1-1 service provider 140 or ALI device 160 may convert the GPS data into a desired format prior to storing the location information in database 510.

In this way, 9-1-1 service provider 140 will be aware of the current location of user device 130 when the user device 130 is on-line. 9-1-1 service provider 140 may periodically update the location of user device 130 in ALI device 160 whether or not a 9-1-1 call is made from user device 130. As a result, ALI device 160 will store accurate/recent location information for user device 130, thus providing PSAPs with actionable dispatch information in cases where the 9-1-1 caller is unable to verbally relay his/her location information or is temporarily unable to receive a GPS signal.

CONCLUSION

Implementations consistent with the principles of the invention use GPS coordinates from a user device for routing a 9-1-1 call from the user device to the appropriate PSAP. In one implementation, the GPS coordinates are provided from a GPS device that is associated with the user device. Implementations consistent with the principles of the invention also allow for periodic updates of ALI information for user devices.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on user device 130, 9-1-1 service provider 140, and PSAP 150 performing certain acts, it will be appreciated that in other implementations consistent with the principles of the invention, the acts described above may be performed by another device in system 100.

Moreover, it will be appreciated that the techniques described herein are equally applicable to non-9-1-1 scenarios. For example, one or more of the techniques described above may be used for VoIP usage tracking and call statistics monitoring/analysis, personalized location-based services (e.g., retail location finder, local new/weather, etc.), and/or geographic information systems (GIS) based enterprise services (e.g., field services, dispatch operations, etc.).

While series of acts have been described with respect to FIGS. 6 and 8, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
  a network device, of an emergency service provider, configured to:
    receive, from a mobile device of a user, first Global Positioning Satellite (GPS) data independent of receiving a call from the mobile device,
    update location information, stored in an Automatic Location Identification (ALI) database, with the first GPS data, the location information corresponding to identification information of the mobile device,
    the ALI database being updated to enable at least one Public Safety Answering Point (PSAP) to provide a service, to the user at a location identified by the first GPS data, independent of a call from the mobile device,
    receive second GPS data and a Voice over Internet Protocol (VoIP) 9-1-1 call from the mobile device,
    receive, from the mobile device, the identification information,
    identify a Public Safety Answering Point (PSAP), that is geographically closest to the received second GPS data, out of a plurality of PSAPs,
    obtain a pseudo telephone number for the identified PSAP,
    forward, using the obtained pseudo telephone number, information associated with the second GPS data and the VoIP 9-1-1 call to the identified PSAP, and
    update, based on receiving the second GPS data and the VoIP 9-1-1 call, the location information stored in the ALI database,
    the location information being updated, in the ALI database, using the second GPS data.

2. The system of claim 1, where the network device is to:
  receive the identification information with the second GPS data and the VoIP 9-1-1 call.

3. The system of claim 2, where the identification information includes a telephone number of the mobile device.

4. The system of claim 1 where, when forwarding the information associated with the second GPS data and the VoIP 9-1-1 call, the network device is further to:
  convert the second GPS data from a first format to a second format that is compatible with the identified PSAP, and
  forward the converted second GPS data to the identified PSAP.

5. The system of claim 4 where the second format includes a wireless Phase I format.

6. The system of claim 4 where the second format includes a wireless Phase II format.

7. A method comprising:
  receiving, by a network device and from a mobile device of a user, first Global Positioning Satellite (GPS) data independent of receiving a call from the mobile device;
  updating, by the network device, location information, stored in an Automatic Location Identification (ALI) database, with the first GPS data, the location information corresponding to identification information of the mobile device,
  the ALI database being updated to enable emergency services to be provided, to the user at a first location identified by the first GPS data, independent of a call from the mobile device,
  receiving, by the network device and from the mobile device, a Voice over Internet Protocol (VoIP) 9-1-1 call, the identification information, and second GPS data that identifies a second location of the mobile device;
  identifying, by the network device, a Public Safety Answering Point (PSAP) using the received second GPS data;
  obtaining, by the network device, a pseudo telephone number for the identified PSAP, the pseudo telephone number being used to route the received VoIP 9-1-1 call and the received second GPS data to the identified PSAP; and
  updating, by the network device, the location information, stored in the ALI database, using the received second GPS data.

8. The method of claim 7 further comprising:
  routing, using the pseudo telephone number, the received VoIP 9-1-1 call to the identified PSAP.

9. The method of claim 8 further comprising:
  routing information associated with the received second GPS data, to the PSAP, with the VoIP 9-1-1 call.

10. The method of claim 9 where the routed information includes the received second GPS data.

11. The method of claim 9 where the routed information includes a converted version of the received second GPS data.

12. A system comprising:
  a first network device, of a service provider, configured to:
    receive, from a second network device of a user, first Global Positioning Satellite (GPS) data independent of receiving a call from the second network device, update location information, stored in an Automatic Location Identification (ALI) database, with the first GPS data, the location information corresponding to identification information, of the second network device, stored in the ALI database, the ALI database being updated to enable emergency services to be provided, to the user at a location identified by the first GPS data, independent of a call from the mobile device, receive, from the second network device, second GPS data and a Voice over Internet Protocol (VoIP) 9-1-1 call, identify a Public Safety Answering Point (PSAP) based on the second GPS data, route the second GPS data and the VoIP 9-1-1 call to the identified PSAP, and update, using the second GPS data, the location information stored in the ALI database.

13. The system of claim 12, where, when receiving the second GPS data, the first network device is to:

receive the second GPS data with the identification information of the second network device.

14. A method comprising:

receiving, by a first device of an emergency service provider, first Global Positioning Satellite (GPS) data from a second device of a user;

updating, by the first device, location information, stored in an Automatic Location Identification (ALI) database, with the first GPS data, the location information corresponding to identification information of the second device, the ALI database being updated to enable emergency services to be provided, to the user at a location identified by the first GPS data, independent of a call from the second device, receiving, by the first device and from the second device, second GPS data, the identification information, and a Voice over Internet Protocol (VoIP) 9-1-1 call;

identifying, by the first device, a Public Safety Answering Point (PSAP) based on the second GPS data;

obtaining, by the first device, a pseudo telephone number for the identified PSAP;

forwarding, by the first device, the VoIP 9-1-1 call and information relating to the second GPS data to the identified PSAP, using the obtained pseudo telephone number; and updating, by the first device, the location information, stored in the ALI database, using the second GPS data.

15. The method of claim 14 where the information, relating to the second GPS data, includes Phase I formatted location information corresponding to the second GPS data.

16. The method of claim 14 where the information, relating to the second GPS data, includes Phase II formatted location information corresponding to the second GPS data.

17. The method of claim 14, where the identification information comprises an Automatic Number Identifier (ANI) associated with the first device, and where the obtained pseudo telephone number includes a pseudo ANI that cannot be assigned to the second device.

18. The method of claim 14, where:

the second GPS data corresponds to GPS data captured by the second device prior the user placing the VoIP 9-1-1 call.

19. The system of claim 12, where the first network device is to receive, from the second network device and at particular time intervals, GPS data independent of receiving a call from the second network device, and where the particular time intervals are configured by the user.

20. The system of claim 12, where the first network device is to route the second GPS data and the VoIP 9-1-1 call to the identified PSAP after updating the ALI database using the second GPS data.

21. The system of claim 12, where the first network device is to route the second GPS data and the VoIP 9-1-1 call to the identified PSAP and update the ALI database using the second GPS data, in parallel.

* * * * *